(12) United States Patent
Kowalski et al.

(10) Patent No.: US 11,946,744 B2
(45) Date of Patent: Apr. 2, 2024

(54) SYNCHRONIZATION OF A GYROSCOPE IN A VIRTUAL-REALITY ENVIRONMENT

(71) Applicant: Hewlett-Packard Development Company, L.P., Spring, TX (US)

(72) Inventors: Kevin David Kowalski, Fort Collins, CO (US); Jonathan Michael Anderson, Fort Collins, CO (US); Matthew James Flach, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 114 days.

(21) Appl. No.: 17/413,879

(22) PCT Filed: Jul. 26, 2019

(86) PCT No.: PCT/US2019/043680
§ 371 (c)(1),
(2) Date: Jun. 14, 2021

(87) PCT Pub. No.: WO2021/021081
PCT Pub. Date: Feb. 4, 2021

(65) Prior Publication Data
US 2022/0146262 A1    May 12, 2022

(51) Int. Cl.
*G01C 19/5776* (2012.01)
*G06F 3/01* (2006.01)

(52) U.S. Cl.
CPC ......... *G01C 19/5776* (2013.01); *G06F 3/016* (2013.01); *G06F 2203/013* (2013.01)

(58) Field of Classification Search
CPC .............. G01C 19/5776; G06F 3/016; G06F 2203/013; G06F 3/011; H04N 21/4131; H04N 21/42202; H04N 21/43072; H04N 21/4728
See application file for complete search history.

(56) References Cited

U.S. PATENT DOCUMENTS

| | | |
|---|---|---|
| RE37,374 E | 9/2001 | Roston et al. |
| 8,777,748 B2 | 7/2014 | Woolston |
| 9,342,147 B2 | 5/2016 | Wilairat et al. |
| 10,048,755 B2 | 8/2018 | Saboune et al. |
| 10,088,903 B2 | 10/2018 | Ullrich et al. |
| 10,102,723 B2 | 10/2018 | Wu |
| 10,782,779 B1 * | 9/2020 | Eubank .................. G06F 3/016 |
| 2016/0195923 A1 | 7/2016 | Nauseef et al. |

(Continued)

OTHER PUBLICATIONS

M. Matsumoto, H. Yano and H. Iwata, "Development of a Motion Teaching System Using an Immersive Projection Display and a Haptic Interface," Second Joint EuroHaptics Conference and Symposium on Haptic Interfaces for Virtual Environment and Teleoperator Systems (WHC'07), 2007, pp. 298-303.

*Primary Examiner* — Seng H Lim
(74) *Attorney, Agent, or Firm* — Quarles & Brady LLP

(57) ABSTRACT

Examples of synchronization of a gyroscope in a virtual-reality (VR) environment are described. In some examples, gyroscopic feedback for VR application content may be predicted. In some examples, a time shift corresponding to a physical system lag of a gyroscope may be added to synchronize the gyroscopic feedback with the VR application content. In some examples, the gyroscopic feedback may be applied based on the time shift.

20 Claims, 4 Drawing Sheets

(56) References Cited

U.S. PATENT DOCUMENTS

| | | |
|---|---|---|
| 2017/0109131 A1 | 4/2017 | Boesen |
| 2017/0193707 A1 | 7/2017 | Seiler |
| 2017/0220112 A1 | 8/2017 | Nakamura et al. |
| 2023/0082266 A1* | 3/2023 | Kelm ........................ G06F 1/12 |
| | | 710/105 |

* cited by examiner

SYNCHRONIZATION OF A GYROSCOPE IN A VIRTUAL-REALITY ENVIRONMENT

BACKGROUND

Electronic devices such as computing devices may provide an immersive audiovisual (AV) experience for a user. Such devices may include virtual-reality (VR) and augmented-reality (AR) computing devices or systems. In some examples, such devices may include a headmounted display (HMD) which may provide a visual display of content for the user. Such HMD's may provide realistic and immersive visual data and/or content, which may encourage the user to feel like s/he is experiencing the visual scenario first-hand or in real life. Additionally, VR and/or AR systems may also provide audio signals and/or content to the user, from headphones or speakers, that is in-sync with the visual content and may also be directional in nature, thereby increasing the immersive experience for the user.

BRIEF DESCRIPTION OF THE DRAWINGS

Various examples will be described below by referring to the following figures.

Figure 1:
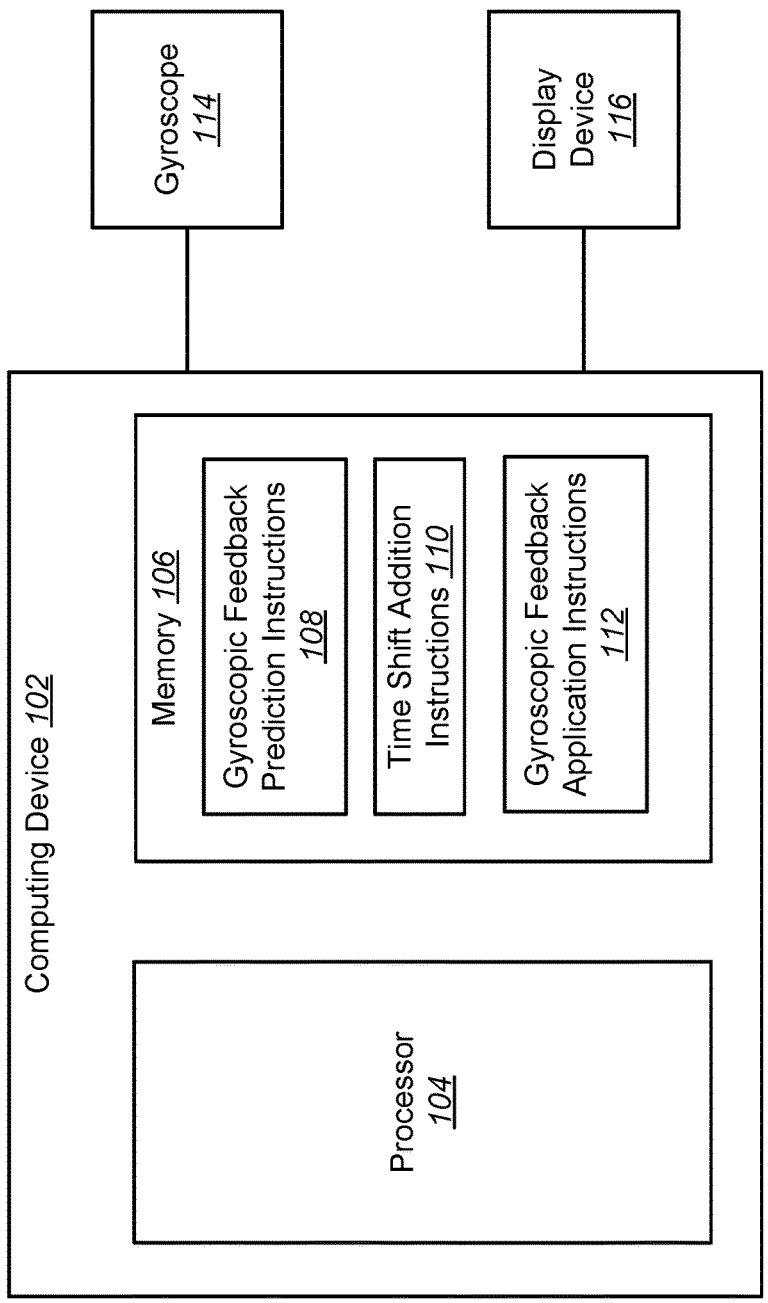
FIG. 1 is a block diagram of an example of a computing device to synchronize a gyroscope in a virtual-reality (VR) environment.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations in accordance with the description; however, the description is not limited to the examples and/or implementations provided in the drawings.

DETAILED DESCRIPTION

Electronic devices such as VR and AR computing devices and systems may provide an immersive simulated audio-visual experience for a user, providing the user the sense that they are immersed within, and experiencing first-hand, the content of which they are seeing and hearing. In some situations, it may be desirable to enhance the immersive experience further by also providing an additional sensory input that corresponds or syncs with the audio-visual content. Such additional sensory input may provide a haptic feedback, for example, a vibration through the VR HMD, headphones or speakers, through hand-held controllers or handles, through haptic suits or vests worn on the user's chest or body, or through boots or other footwear. Sometimes a walking or movement pad or treadmill may even be employed to simulate to the user the ability to walk or move around in the virtual environment that they are experiencing. Such haptic feedback or felt force, however, is generally fleeting, temporary, mild, or in other ways less realistic than desirable.

In some situations, it may be desirable to employ a VR computing system or device that has the capability to provide sustained force or haptic feedback to the user to further simulate the virtual environment and make the experience more realistic, for example, when simulating gravitational forces (G forces). Additionally, in some situations, it may be further desirable to assist or resist the turning of the user's head, hand, or other body member in response to the audio-visual experience to either make the VR experience less taxing on the user's neck or other body member, more taxing on the user's arms or other body member, or to further enhance the realism of the experience, depending on the content being viewed.

Implementations of the present disclosure provide gyroscope devices that are able to impart a sustained torque and/or force on a user's body while the user is experiencing VR application content, thus increasing the realism of the simulated environment. In some examples, the physical properties of a gyroscope may result in a physical system lag. For example, a gyroscope may take a certain amount of time to get to speed. The present disclosure provides examples of synchronizing gyroscopic feedback VR application content. Gyroscopic feedback may be predicted and applied based on a time shift corresponding to the physical system lag of the gyroscope. In some examples, end users may enjoy a benefit by having a physical experience that matches the visual experience.

FIG. 1 is a block diagram of an example of a computing device 102 to synchronize a gyroscope 114 in a virtual-reality (VR) environment. The computing device 102 may be an electronic device, such as a server computer, a personal computer, a smartphone, a tablet computer, a headmounted display (HMD), a gaming console, etc. The computing device 102 may include and/or may be coupled to a processor 104 and/or a memory 106. In some examples, the computing device 102 may include a display and/or an input/output interface. In some examples, the computing device 102 may be in communication with (e.g., coupled to, have a communication link with) an external device (e.g., a server computer, a personal computer, a smartphone, a tablet computer, etc.). The computing device 102 may include additional components (not shown) and/or some of the components described herein may be removed and/or modified without departing from the scope of this disclosure.

The processor 104 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 106. The processor 104 may fetch, decode, and/or execute instructions (e.g., gyroscopic feedback prediction instructions 108, time shift addition instructions 110 and/or gyroscopic feedback application instructions 112) stored in the memory 106. In some examples, the processor 104 may include an electronic circuit or circuits that include electronic components for performing a function or functions of the instructions (e.g., gyroscopic feedback prediction instructions 108, time shift addition instruction 110 and/or gyroscopic feedback application instructions 112). In some examples, the processor 104 may perform one, some, or all of the functions, operations, elements, methods, etc., described in connection with one, some, or all of FIGS. 1-4.

In some examples, the computing device 102 may include multiple processors to implement different aspects of the gyroscope synchronization described herein. For example, the computing device 102 may include a CPU and a GPU.

The memory 106 may be any electronic, magnetic, optical, or other physical storage device that contains or stores electronic information (e.g., instructions and/or data). The memory 106 may be, for example, Random Access Memory (RAM), Electrically Erasable Programmable Read-Only Memory (EEPROM), a storage device, an optical disc, and the like. In some examples, the memory 106 may be volatile and/or non-volatile memory, such as Dynamic Random Access Memory (DRAM), EEPROM, magnetoresistive random-access memory (MRAM), phase change RAM (PCRAM), memristor, flash memory, and the like. In some implementations, the memory 106 may be a non-transitory tangible machine-readable storage medium, where the term "non-transitory" does not encompass transitory propagating signals. In some examples, the memory 106 may include multiple devices (e.g., a RAM card and a solid-state drive (SSD)).

In some examples, the computing device 102 may include an input/output interface through which the processor 104 may communicate with an external device or devices (e.g., gyroscope 114 and/or display device 116), for instance, to receive and store information (e.g., the state of the gyroscope 114). The input/output interface may include hardware and/or machine-readable instructions to enable the processor 104 to communicate with the external device or devices. The input/output interface may enable a wired or wireless connection to the external device or devices (e.g., gyroscope 114 and display device 116, etc.). The input/output interface may further include a network interface card and/or may also include hardware and/or machine-readable instructions to enable the processor 104 to communicate with various input and/or output devices, such as a keyboard, a mouse, a touchscreen, a microphone, a controller, another apparatus, electronic device, computing device, etc., through which a user may input instructions into the computing device 102. In some examples, the computing device 102, the gyroscope 114 and the display device 116 may form a VR system.

A gyroscope 114 implemented in a VR environment may be synchronized with visual stimuli. For example, a force generated by the gyroscope 114 may be synchronized with a future visual frame displayed on the display device 116 by predicting gyroscopic feedback. In some examples, the gyroscope 114 may be wearable by a user. For instance, the gyroscope 114 may be included in a headset, a hand controller, or a chest vest, for example.

In some examples, the gyroscope 114 may include a spinning component and a motor to cause the spinning component to spin. The spinning component may exert a force on a user. In some examples, the gyroscope 114 may include an actuator to change the orientation of the spinning component. When the gyroscope 114 changes orientation, a force may be exerted upon the user. The gyroscopic forces (referred to herein as gyroscopic feedback) may be used by the VR application content to simulate an immersive experience for the user.

As used herein, VR application content includes instructions to implement a VR scene. The VR application content may be presented to a user by VR visual frames. The VR application content may also include events, which include actions (e.g., VR stimuli) that are to be applied during a VR visual frame.

The computing device 102 may predict the simulated gyroscopic feedback in the VR application content. The computing device 102 may then add a time shift that corresponds with the physical system lag of the gyroscope 114 to synchronize the visual stimuli with the physical force applied by the gyroscope 114.

In some examples, a gyroscope 114 may have physical system lag. For example, the physical system lag may be a certain amount of time to accelerate or decelerate a gyroscope 114. In some examples, the VR application content may include visual stimuli. For example, the computing device 102 may render a VR visual frame to be displayed by the display device 116. The physical system lag may be synchronized to create forces that align with the visual stimuli. By synchronizing the visual stimuli with the physical forces of the gyroscope 114, the VR experience may be more realistic.

In some examples, the computing device 102 may predict gyroscopic feedback for the VR application content. For example, the processor 104 may implement the gyroscopic feedback prediction instructions 108 to predict gyroscopic feedback for VR application content. In some examples, the predictive analysis may be performed by VR application rendering pipelines.

In some examples, predicting the gyroscopic feedback may include determining the gyroscopic feedback for a predicted state of the VR application content. This may include determining a physical force to be applied by the gyroscope 114 for the predicted state of the VR application content. For example, the computing device 102 may determine where the gyroscope 114 is expected to be in an upcoming visual frame. This may include predicting the pose of the gyroscope 114 in the upcoming visual frame in relation to the user's body. For example, if the gyroscope 114 is attached to a user's head, the computing device 102 may predict the user's head pose for the upcoming frame.

In some examples, predicting the gyroscopic feedback for the VR application content may include determining a time when a gyroscope event is expected to occur. For example, an upcoming frame in the VR scene may include an event that uses gyroscopic feedback. The computing device 102 may determine whether the gyroscope 114 is to be used in the upcoming frame. The computing device 102 may then determine what forces are to be applied by the gyroscope 114 based on the event that uses gyroscopic feedback.

In an example of an event, an end user may be holding a motion controller with the gyroscope 114. In a VR scene, the end user is holding one end of a sail. A wind gust blows into the sail and an event is triggered to apply a force to the motion controller that corresponds with the direction of the wind. In this case, the computing device 102 may predict how to change the orientation of the gyroscope 114 to generate a force that simulates the pull of the wind.

In another example of an event using a gyroscope 114, an end user may wear a vest containing the gyroscope 114. In the VR scene, the end user is traveling in a vehicle. In the VR application content, the virtual vehicle may be mapped for gyroscope output. As the vehicle applies acceleration, force may be simulated using the gyroscope 114.

In some examples, the gyroscope 114 may communicate its current pose (e.g., six degree-of-freedom pose) to the computing device 102. The computing device 102 may predict the gyroscopic feedback for a future VR visual frame based on the current pose of the gyroscope 114 and the VR application content. For example, the computing device 102 may determine how to generate the correct gyroscope forces for the upcoming VR visual frame using the current pose of the gyroscope 114.

In some examples, the computing device 102 may add a time shift corresponding to a physical system lag of the gyroscope 114 to synchronize the gyroscopic feedback with the VR application content. For example, the processor 104 may implement the time shift addition instructions 110. The time shift may include an amount of time to actuate the gyroscope 114 to synchronize the visual stimuli with a physical force applied by the gyroscope 114. In some examples, the physical system lag of the gyroscope 114 may be an amount of time to change the rotational speed of the gyroscope 114.

In some examples, the computing device 102 may be preconfigured with performance characteristics of the gyroscope 114. The performance characteristics may indicate the amount of time to change the rotational speed of the gyroscope 114. For example, the performance characteristics may indicate how long the gyroscope 114 will take to speed up (e.g., increase rotational speed) or slow down (e.g., decrease rotational speed).

Because the gyroscope 114 may take some time to reach a certain state (e.g., rotational speed) for the predicted gyroscopic feedback, the computing device 102 may add the time shift before applying the gyroscopic feedback. In some examples, the time shift may be an amount of time that the gyroscope 114 prepares the gyroscopic feedback before a VR visual frame is displayed. In other examples, the time shift may be a number of VR visual frames that may be processed before applying the gyroscopic feedback.

The gyroscope 114 may be prepared for the gyroscopic feedback during the time shift. The gyroscope 114 may prepare the gyroscopic feedback during the time shift to apply a physical force that is synchronized with the VR application content. For example, the computing device 102 may instruct the gyroscope 114 to reach a certain rotational speed during the time shift to achieve the predicted gyroscopic feedback. In an implementation, the processor 104 may send a signal to the gyroscope 114 to prepare the gyroscopic feedback during the time shift. In some examples, the gyroscope 114 may speed up or slow down rotation in response to receiving an instruction from the computing device 102. In other examples, the actuator may change the orientation of the gyroscope during the time shift.

The gyroscopic feedback may be applied based on the time shift. For example, the processor 104 may implement the gyroscopic feedback application instructions 112 to cause the gyroscope 114 to apply the gyroscopic feedback. The gyroscope 114 may apply the gyroscopic feedback at the end of the time shift when the VR visual frame is displayed by the display device 116. In some examples, the computing device 102 (e.g., the processor 104) may send a signal to the gyroscope 114 at the end of the time shift instructing the gyroscope 114 to apply the gyroscopic feedback.

In some examples, the gyroscope 114 may apply the gyroscopic feedback by changing orientation. For instance, the actuator may change the orientation of the gyroscope 114. The change in orientation by the rotating gyroscope 114 may exert a force on the user. In other examples, the gyroscope 114 may change its angular velocity, which may also impose forces.

In some examples, the gyroscope 114 may be manipulated by the VR application content through an interface. For example, the gyroscope 114 may be accessed through an application programming interface (API). This API may be a library containing functions and/or states of the gyroscope 114. In other examples, the API may be integrated into a content development tool such as a video game engine. Changes in the state of the gyroscope 114 may be triggered through events in the VR application content or may be mapped to a specific object in a VR scene.

Figure 2:
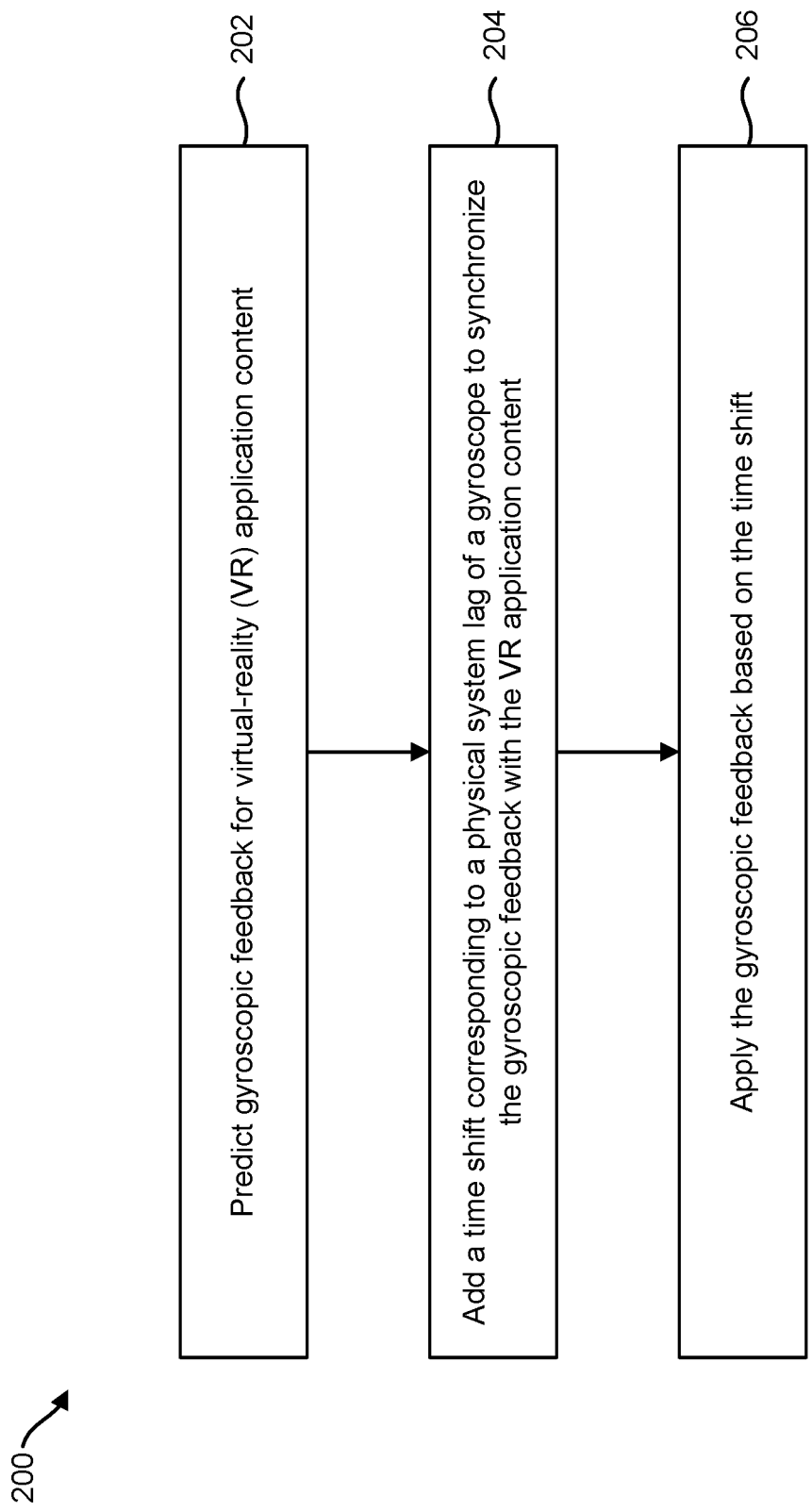
FIG. 2 is a flow diagram illustrating an example of a method for synchronization of a gyroscope in a VR environment.

FIG. 2 is a flow diagram illustrating an example of a method 200 for synchronization of a gyroscope 114 in a VR environment. The method 200 for gyroscope synchronization may be performed by, for example, a computing device 102 and/or a processor 104. In some examples, the gyroscope 114 may be included in a headset, a hand controller, or a chest vest. The gyroscope 114 may be in communication (e.g., electronic communication) with the computing device 102.

The computing device 102 may predict 202 gyroscopic feedback for VR application content. In some examples, the VR application content may include visual stimuli. For example, the computing device 102 may render a VR visual frame to be displayed by a display device 116. The VR application content may include an event that uses the gyroscopic feedback. In some examples, predicting 202 the gyroscopic feedback may include determining the gyroscopic feedback for a predicted state of the VR application content. This may include determining a physical force to be applied by the gyroscope 114 for the predicted state of the VR application content.

The computing device 102 may add 204 a time shift corresponding to a physical system lag of the gyroscope 114 to synchronize the gyroscopic feedback with the VR application content. For example, the time shift may include an amount of time to actuate the gyroscope 114 to synchronize the visual stimuli with a physical force applied by the gyroscope 114. The physical system lag of the gyroscope 114 may include an amount of time to change the rotational speed of the gyroscope 114.

In some examples, the computing device 102 may add 204 the time shift by first determining how much time it will take for the gyroscope 114 to reach a certain rotational speed. The computing device 102 may be preconfigured with performance characteristics of the gyroscope 114. The performance characteristics may indicate the amount of time to change the rotational speed of the gyroscope 114. Using performance characteristics, the computing device 102 may determine the time shift to start preparing the gyroscope 114 for the predicted gyroscopic feedback.

In other examples, the time shift may be a fixed amount of time that will allow the gyroscope 114 to prepare to generate the predicted gyroscopic feedback. For example, the computing device 102 may delay applying the gyroscopic feedback by a fixed amount when gyroscopic feedback is predicted to accompany a VR visual frame.

The gyroscope 114 may be prepared for the gyroscopic feedback during the time shift. The computing device 102 may send a signal to the gyroscope 114 to prepare the gyroscopic feedback during the time shift. For example, the computing device 102 may instruct the gyroscope 114 to change rotational speed during the time shift to achieve the predicted gyroscopic feedback at the end of the time shift.

The computing device 102 may apply 206 the gyroscopic feedback based on the time shift. For example, the computing device 102 may cause the gyroscope 114 to apply the gyroscopic feedback at the end of the time shift. For instance, the computing device 102 may send a signal to the gyroscope 114 to change the orientation of the gyroscope 114. The change in orientation by the gyroscope 114 may exert a force on the user. In another example, the gyroscope 114 may change its angular velocity based on a signal received from the computing device 102.

In some examples, the gyroscope 114 may apply 206 the gyroscopic feedback when the VR visual frame is displayed by the display device 116. Because the gyroscope 114 was prepared for the gyroscopic feedback during the time shift, the gyroscope 114 may apply the correct gyroscopic feedback (e.g., force) when the VR visual frame is displayed. In this manner, the gyroscopic feedback may be synchronized with the VR visual frame.

Figure 3:
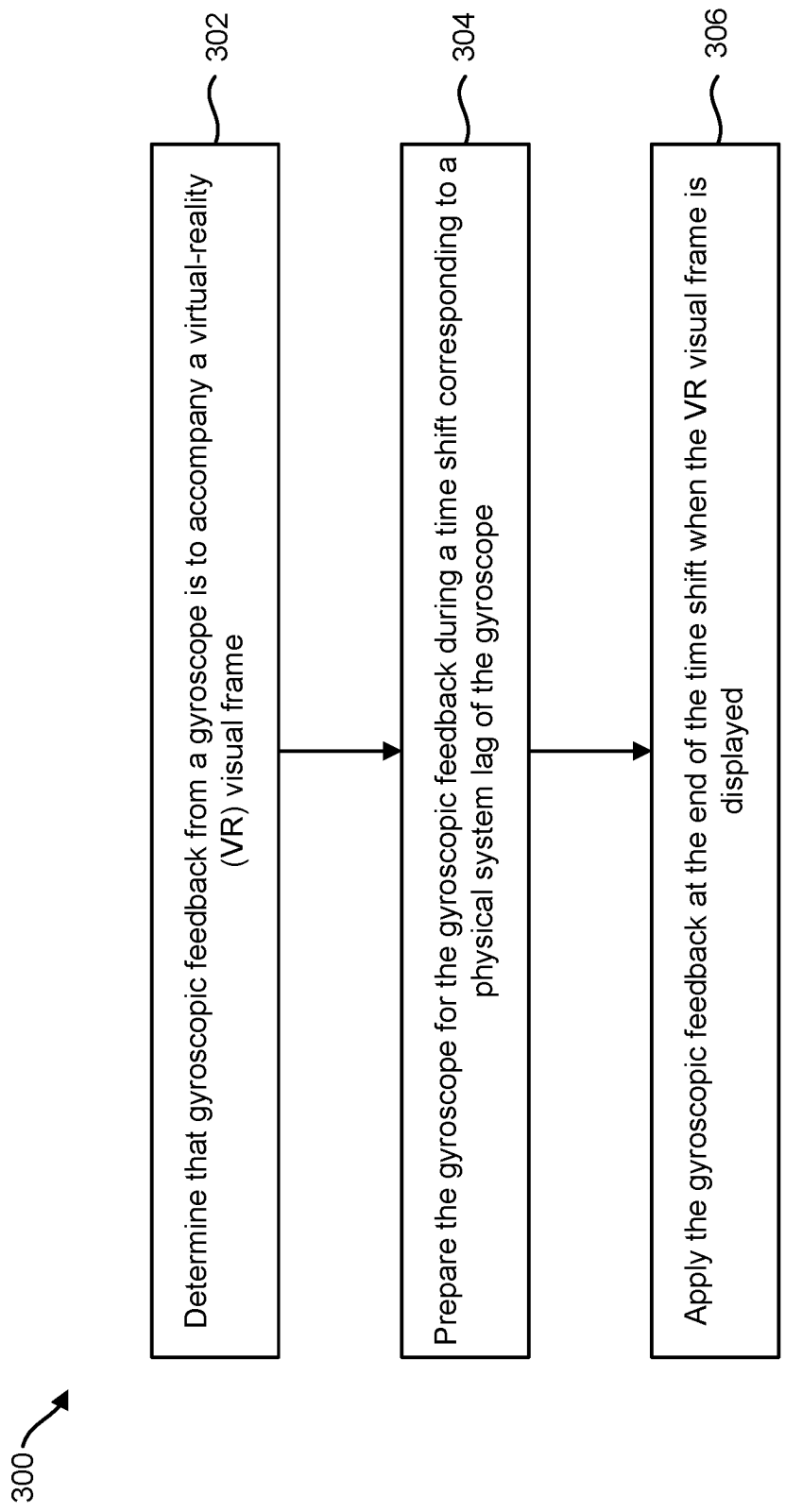
FIG. 3 is a flow diagram illustrating another example of a method for synchronization of a gyroscope in a VR environment.

FIG. 3 is a flow diagram illustrating another example of a method 300 for synchronization of a gyroscope 114 in a VR environment. The method 300 for gyroscope synchronization may be performed by, for example, a computing device 102 and/or a processor 104.

The computing device 102 may determine 302 that gyroscopic feedback from a gyroscope is to accompany a virtual-reality (VR) visual frame. For example, the computing device 102 may determine that a future VR visual frame may include an event that uses gyroscopic feedback.

The computing device 102 may prepare 304 the gyroscope 114 for the gyroscopic feedback during a time shift corresponding to a physical system lag of the gyroscope 114. The time shift may be an amount of time used to prepare the gyroscope 114 before applying the gyroscopic feedback. For example, the computing device 102 may send a signal to the gyroscope 114 to change rotational speed during the time shift. The gyroscope 114 may increase or decrease its rotational speed in response to the signal.

In some examples, the computing device 102 may update a VR simulation while the gyroscope 114 is prepared during the time shift. For example, while the gyroscope 114 is preparing for the gyroscopic feedback, the computing device 102 may take measurements from sensors to determine the current state of the VR system. The computing device 102 may then generate a VR simulation for a future VR visual frame based on the sensor readings. The computing device 102 may then render the VR visual frame during the time shift based on the updated VR simulation.

The computing device 102 may apply 306 the gyroscopic feedback at the end of the time shift when the VR visual frame is displayed. For example, at the end of the time shift, the computing device 102 may cause the rendered VR visual frame to be displayed on a display device 116 (e.g., HMD). The computing device 102 may also send a signal to the gyroscope 114 to apply 306 the gyroscopic feedback. For example, the computing device 102 may send a signal to the gyroscope 114 to change the orientation of the gyroscope 114. In another example, the gyroscope 114 may change its angular velocity based on a signal received from the computing device 102.

Figure 4:
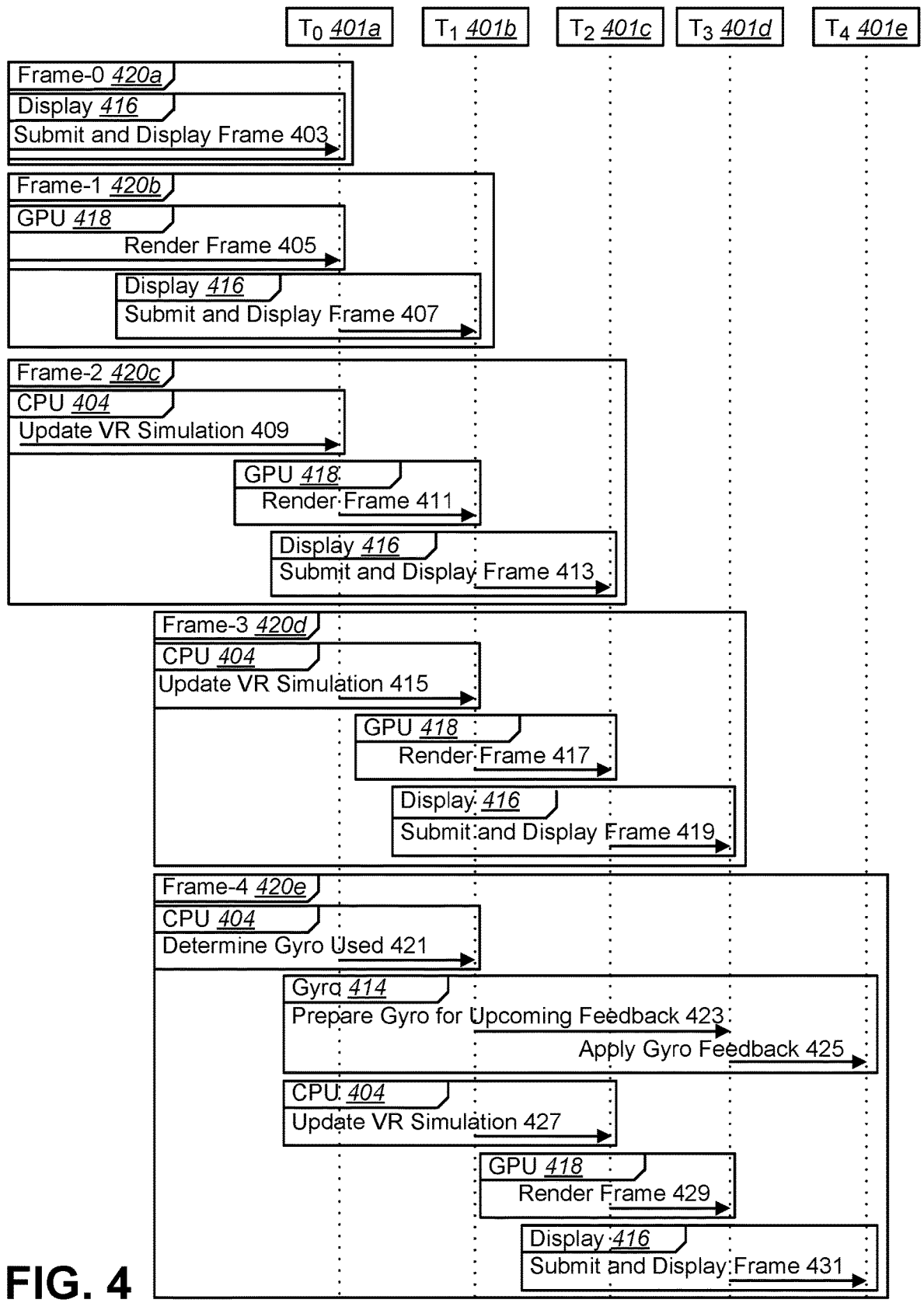
FIG. 4 is a sequence diagram illustrating an example of synchronization of a gyroscope in a VR environment.

FIG. 4 is a sequence diagram illustrating an example of synchronization of a gyroscope 414 in a VR environment. In this example, forces generated by a gyroscope 414 may be synchronized with a VR visual frame 420.

A number of times (T) 401a-e are shown. In some examples, a time (T) may represent the moment when an image of the VR visual frame 420 is displayed on a display 416. The time (T) may also be referred to as a VSync.

Prior to display of a VR visual frame 420, there may be multiple processes to simulate where the user is in relation to the VR application content and to prepare the VR visual frame 420. In some examples, this may include updating the VR simulation and rendering the VR visual frame 420. If the VR simulation has determined (i.e., predicted) that gyroscopic feedback is to accompany a future VR visual frame 420, the gyroscope 414 may be prepared so that gyroscopic forces are applied at the correct time.

In FIG. 4, a number of VR visual frames 420a-e are shown. A number of processes used to generate the VR visual frames 420a-e and prepare the gyroscope 414 are shown within a corresponding VR visual frame.

For the first VR visual frame (Frame-0) 420a, at $T_0$ 401a, Frame-0 420a is submitted 403 to be displayed by the display 416.

For the second VR visual frame (Frame-1) 420b, at $T_0$ 401a, Frame-1 420b is rendered 405 by a graphics processing unit (GPU) 418. At $T_1$ 401b, Frame-1 420b is submitted 407 to be displayed by the display 416.

For the third VR visual frame (Frame-2) 420c, at $T_0$ 401a, the VR simulation is updated 409 by a central processing unit (CPU) 404. At $T_1$ 401b, Frame-2 420c is rendered 411 by the GPU 418. At $T_2$ 401c, Frame-2 420c is submitted 413 to be displayed by the display 416.

For the fourth VR visual frame (Frame-3) 420d, at $T_1$ 401b, the VR simulation is updated 415 by the CPU 404. At $T_2$ 401c, Frame-3 420d is rendered 417 by the GPU 418. At $T_3$ 401d, Frame-3 420d is submitted 419 to be displayed by the display 416.

For the fifth VR visual frame (Frame-4) 420e, at $T_1$ 401b, the CPU 404 determines 421 (e.g., predicts) that gyroscopic feedback is to be used with Frame-4 420e. From $T_1$ 401b through $T_3$ 401d, the gyroscope (gyro) 414 is prepared 423 to apply the upcoming forces. For example, the gyroscope 414 may change its rotational speed during this time period. At time $T_4$ 401e, the gyroscope 414 may apply 425 the gyroscopic feedback.

In this example, $T_1$ 401b through $T_3$ 401d represent the time shift corresponding to the physical system lag of the gyroscope 414. In other words, $T_1$ 401b through $T_3$ 401d represent a shift in time from when the gyroscope 414 is determined 421 to be used and when the gyroscopic feedback is applied 425.

Continuing the description of Frame-4 420e, at $T_2$ 401c, the VR simulation is updated 427 by the CPU 404. At $T_3$ 401d, Frame-4 420e is rendered 429 by the GPU 418. At $T_4$ 401e, Frame-4 420e is submitted 431 to be displayed by the display 416. It should be noted that Frame-4 420e is displayed 431 at the same time that the gyroscopic feedback is applied 425. In other words, the gyroscopic feedback is synchronized with the display of Frame-4 420e. It should be further noted that the VR simulation for Frame-4 420e is updated 427 and rendered 429 during the time shift while the gyroscope 414 is prepared 423 to apply the gyroscopic feedback.

It should be noted that while various examples of systems and methods are described herein, the disclosure should not be limited to the examples. Variations of the examples described herein may be implemented within the scope of the disclosure. For example, functions, aspects, or elements of the examples described herein may be omitted or combined.

The invention claimed is:

1. A method, comprising:
   predicting gyroscopic feedback for virtual-reality (VR) application content based on a VR visual frame of the VR application content to be presented to a user via a display device;
   adding a time shift corresponding to a physical system lag of a gyroscope to synchronize the gyroscopic feedback with the VR application content, wherein adding the time shift corresponding to the physical system lag of the gyroscope comprises sending a signal to the gyroscope at a first time that causes the gyroscope to move between a first orientation at the first time and a second orientation at a second time;
   applying the gyroscopic feedback to the user via the gyroscope at the second time based on the time shift; and presenting the VR visual frame of the VR application content to the user via the display device at the second time to synchronize the gyroscopic feedback with the VR application content.

2. The method of claim 1, wherein the VR application content comprises visual stimuli.

3. The method of claim 2, wherein the time shift comprises an amount of time to actuate the gyroscope to synchronize the visual stimuli with a physical force applied by the gyroscope.

4. The method of claim 1, wherein predicting the gyroscopic feedback comprises determining the gyroscopic feedback for a predicted state of the VR application content.

5. The method of claim 4, wherein predicting the gyroscopic feedback comprises determining a physical force to be applied by the gyroscope for the predicted state of the VR application content.

6. The method of claim 1, wherein the physical system lag of the gyroscope comprises an amount of time to change a rotational speed of the gyroscope.

7. A method, comprising:
  determining that gyroscopic feedback from a gyroscope is to accompany a virtual-reality (VR) visual frame during presentation of VR content to a user via a display device;
  preparing the gyroscope for the gyroscopic feedback during a time shift corresponding to a physical system lag of the gyroscope, wherein preparing the gyroscope for the gyroscopic feedback during the time shift comprises sending a signal to the gyroscope at a first time that causes the gyroscope to move between a first orientation at the first time and a second orientation at a second time;
  applying the gyroscopic feedback to the user via the gyroscope at the second time; and
  presenting the VR visual frame to the user via the display device at the second time.

8. The method of claim 7, further comprising updating a VR simulation while preparing the gyroscope for the gyroscopic feedback during the time shift.

9. The method of claim 8, further comprising rendering the VR visual frame during the time shift based on the updated VR simulation.

10. The method of claim 7, wherein preparing the gyroscope for the gyroscopic feedback during the time shift comprises sending a second signal to the gyroscope at the first time that causes the gyroscope to change rotational speed during the time shift.

11. A virtual-reality (VR) system, comprising:
  a gyroscope;
  a display device; and
  a processor to:
    predict gyroscopic feedback for virtual reality (VR) application content based on a VR visual frame of the VR application content to be presented to a user via the display device;
    add a time shift corresponding to a physical system lag of the gyroscope to synchronize the gyroscopic feedback with the VR application content by sending a signal to the gyroscope at a first time that causes the gyroscope to move between a first orientation at the first time and a second orientation at a second time;
    apply the gyroscopic feedback to the user via the gyroscope at the second time based on the time shift; and
    present the VR visual frame of the VR application content to the user via the display device at the second time to synchronize the gyroscopic feedback with the VR application content.

12. The VR system of claim 11, wherein the gyroscope is included in a headset, a hand controller, or a chest vest.

13. The VR system of claim 11, wherein the display device comprises a head-mounted display device.

14. The VR system of claim 11, wherein the processor is to send a second signal to the gyroscope at the first time to cause the gyroscope to change rotational speed during the time shift.

15. The VR system of claim 11, wherein the processor is to apply the gyroscopic feedback at the second time by causing the gyroscope to apply a physical force to the user that is synchronized with the VR application content.

16. The method of claim 1, wherein presenting the VR visual frame of the VR application content to the user via the display device at the second time comprises presenting the VR visual frame of the VR application content to the user via a head-mounted display device.

17. The method of claim 16, wherein the gyroscope is included in a hand controller or in a chest vest used by the user.

18. The method of claim 1, wherein adding the time shift corresponding to the physical system lag of the gyroscope comprises sending a second signal to the gyroscope at the first time that causes the gyroscope to change rotational speed during the time shift.

19. The method of claim 7, wherein presenting the VR visual frame to the user via the display device at the second time comprises presenting the VR visual frame to the user via a head-mounted display device.

20. The method of claim 19, wherein the gyroscope is included in a hand controller or in a chest vest used by the user.

* * * * *